United States Patent [19]

Battles

[11] 4,067,607
[45] Jan. 10, 1978

[54] COMBINATION STOOL AND FISHING TACKLE BOX

[76] Inventor: Lee J. Battles, 123 Briarwood, Moore, Okla. 73060

[21] Appl. No.: 754,664

[22] Filed: Dec. 27, 1976

[51] Int. Cl.$^2$ ............................................. A47C 7/62
[52] U.S. Cl. .................................... 297/192; 297/462; 312/202
[58] Field of Search .............. 297/192, 118, 462, 188; 108/140, 103; 312/33, 97.1, 197, 202, 252, 201; 43/54.5 R, 57.5 R; 206/315

[56] References Cited

U.S. PATENT DOCUMENTS

| | | | |
|---|---|---|---|
| 1,221,339 | 4/1917 | Labadie et al. | 312/201 |
| 1,687,149 | 10/1928 | Shauer et al. | 312/252 X |
| 1,924,365 | 8/1933 | Marriotti | 312/33 |
| 2,582,421 | 1/1952 | Essman | 312/201 |
| 2,607,946 | 8/1952 | Price et al. | 297/192 X |
| 3,022,600 | 2/1962 | Glascoff | 43/57.5 R |
| 3,161,315 | 12/1964 | Braun | 312/201 X |
| 3,378,134 | 4/1968 | Wilkinson et al. | 43/54.5 R |
| 3,728,003 | 4/1973 | Bohannon | 312/201 X |
| 3,746,391 | 7/1973 | Novak | 297/462 X |
| 3,751,845 | 8/1973 | van Leeuwen | 43/57.5 R |

FOREIGN PATENT DOCUMENTS

| | | | |
|---|---|---|---|
| 1,347,720 | 11/1963 | France | 312/201 |

*Primary Examiner*—James T. McCall
*Attorney, Agent, or Firm*—Robert K. Rhea

[57] ABSTRACT

An upright cylindrical housing having closed ends is provided with a wall diametrically and longitudinally divided intermediate its ends to define a stationary wall portion and a movable wall portion. The movable wall portion forms a door slidably disposed in circular tracks formed by the respective end of the housing to cover and uncover an access opening formed by the divided wall. The housing is transversely divided by a plurality of partitions arranged in vertically spaced relation to form a plurality of compartments. Each of the partitions rotatably support a circular upwardly open fishing tackle receiving tray with each of the trays being movable outwardly through the access opening with respect to its supporting partition by a radial slot formed in the respective partition.

2 Claims, 4 Drawing Figures

U.S. Patent      Jan. 10, 1978      4,067,607
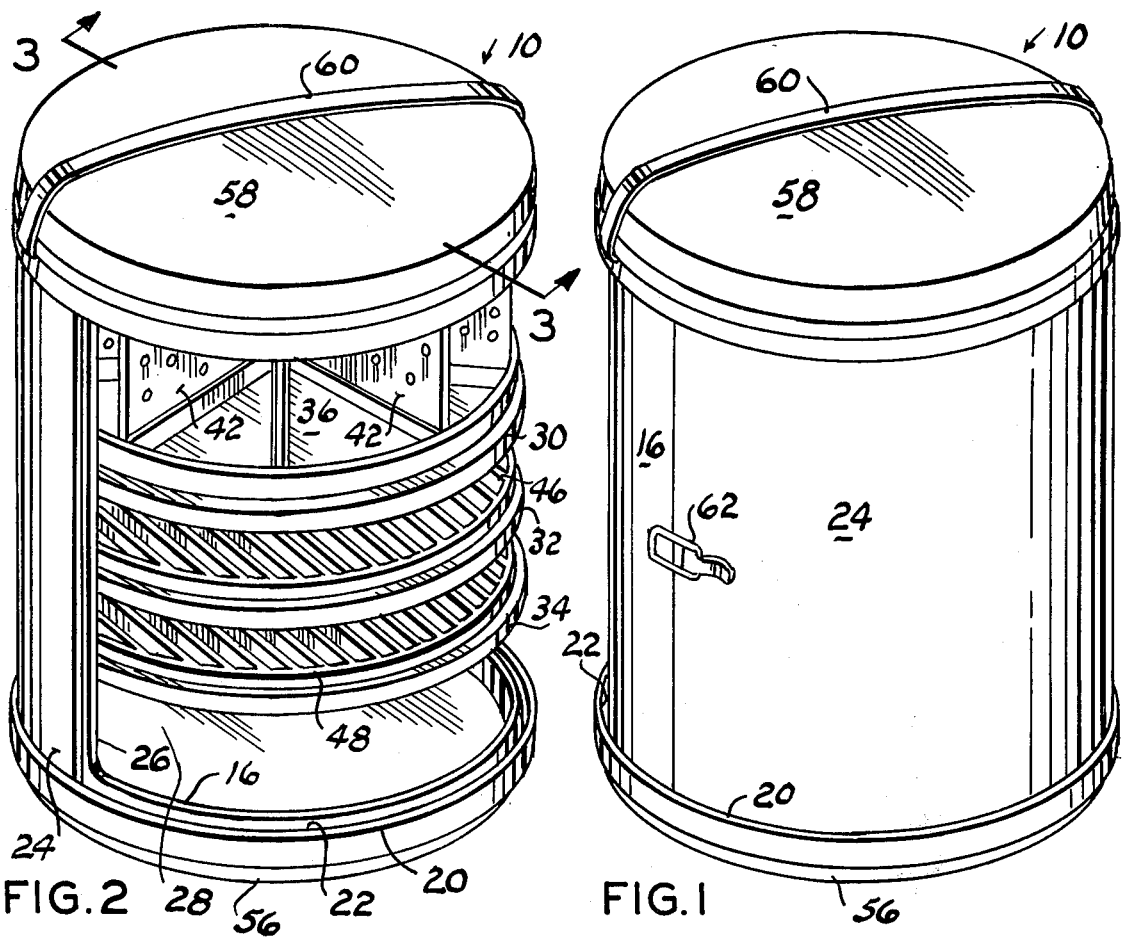
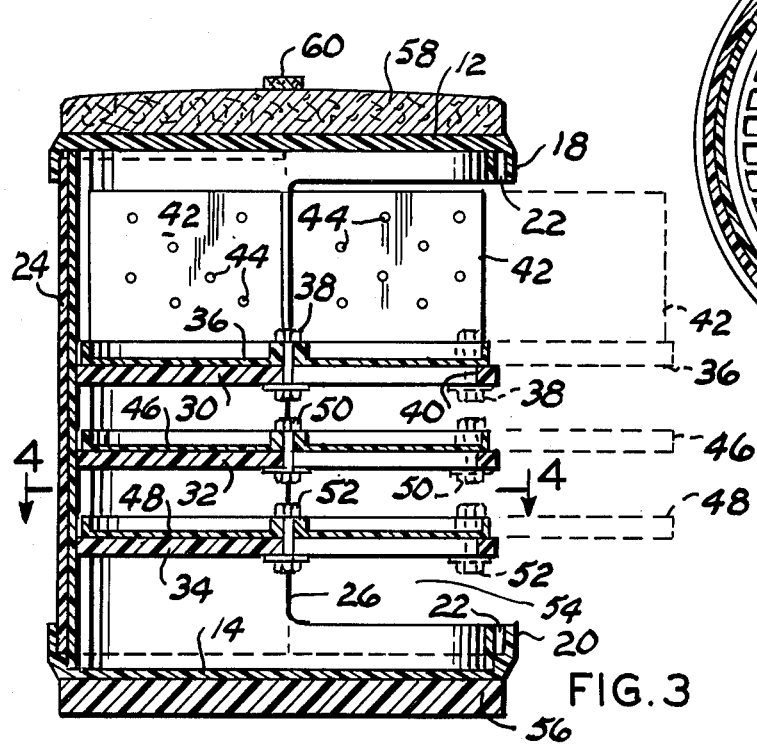

COMBINATION STOOL AND FISHING TACKLE BOX

Background Of The Invention

1. Field of the Invention

The present invention relates to fishing tackle and more particularly to a combination stool and compartmentalized fishing tackle box for storing a plurality of fishing lures, or the like, for ease in access thereto through a door closed opening formed in the wall of the tackle box.

2. Description of the Prior Art

The prior art discloses upright tackle boxes some of which are provided with a door closed opening in its wall for access to the fishing tackle contained thereby, such as U.S. Pat. Nos. 3,022,600 or 3,378,134. Both of these patents disclose a coaxial inner member having shelves or hooks supporting a plurality of lures, or the like, with the inner member being rotatable to expose a particular lure or lures.

This invention is distinctive over these and other similar tackle boxes by providing an opening in its wall extending through substantially 180°, the opening being closed by a sliding wall panel for visually locating a particular group of lures, or the like. Further, the lures supported by this tackle box are contained by a plurality of circular trays rotatable about the axis of the tackle box and movable radially outwardly of the tackle box by a sliding connection between the respective tray and its supporting partition.

SUMMARY OF THE INVENTION

A generally cylindrical tackle box, having closed ends, is provided with a seat or cushion on its normally upwardly disposed end and a floatation panel secured to its downwardly disposed end. The wall of the tackle box is diametrically divided to define a door opening. A part circular sliding door panel, guided by tracks formed in the respective end of the housing, covers and uncovers the door opening. Horizontal vertically spaced circular partitions divide the housing into a plurality of compartments. Each partition supports a circular flat-like tray which may be rotated individually of the respective partition about the vertical axis of the housing and which may be moved as a unit radially outward through the door opening a distance slightly less than the radius of the respective partition by a radial slot formed in each partition.

The principal object of this invention is to provide a combination seat and floatable fishing tackle box of generally cylindrical configuration having a door opening extending through substantially 180° which is opened and closed by a sliding door panel for exposing or concealing a plurality of circular trays supported by a like plurality of partitions wherein the trays may be moved radially outward through the door opening for access to contained fishing tackle or other articles.

BRIEF DESCRIPTION OF THE DRAWINGS

FIG. 1 is a perspective view of the tackle box in door closed position;

FIG. 2 is a perspective view illustrating the tackle box in door opened position;

FIG. 3 is a vertical cross sectional view taken substantially along the line 3—3 of FIG. 2 and illustrating, by dotted lines, outward movement of the tackle box trays; and, FIG. 4 is a horizontal sectional view partially in elevation taken substantially along the line 4—4 of FIG. 3.

DESCRIPTION OF THE PREFERRED EMBODIMENT

Like characters of reference designate like parts in those figures of the drawings in which they occur.

In the drawings:

The reference numeral 10 indicates the tackle box, as a whole, which is upright cylindrical in general configuration formed by top and bottom end walls 12 and 14, respectively, joined to the ends of a cylindrical wall 16. The end walls 12 and 14 are each provided with a flange 18 and 20, respectively, arranged in confronting relation and spaced outwardly of the cylindrical wall 16 a distance slightly greater than the thickness of the wall 16 to form a slot or track 22 adjacent the respective end wall for slidably receiving respective end edge portions of a movable part-cylindrical wall-like door 24. The door 24 is formed on a radius complemental with the wall 16 and extends through at least 180°. Intermediate its height the side wall 16 is diametrically cutaway, as at 26, with the end limits of the cutaway portion being defined by the horizontal planes formed by the depending limit of the upper end flange 18 and the upper limit of the bottom end flange 20. The cut-out portion 26 forms a door opening 28 for access to the interior of the tackle box.

The tackle box is provided with a plurality of horizontal partitions 30, 32 and 34 arranged in vertically spaced relation and secured to the inner surface of the wall 16. The uppermost partition 30 is coaxially connected with a circular generally flat-like compartmentalized tray 36 by bolt and nut means 38 so that the tray 36 may be rotated about the axis of the bolt. The partition 30 is further provided with a radial slot 40 communicating with the bolt means 38 so that the tray may be moved outwardly through the door opening 28, as shown by dotted lines (FIG. 3), when the door is rotated to an open position, as shown in FIG. 2. The tray 36 is further provided with a plurality of radial upstanding panels 42 arranged in circumferentially spaced relation and provided with transverse apertures 44 for supporting fishing tackle articles, not shown.

The other two partitions 32 and 34 are formed identical with respect to the partition 30 and are similarly connected with other circular trays 46 and 48, respectively, by bolt means 50 and 52, respectively. The trays 46 and 48 similarly may be moved outwardly through the door opening for access to fishing tackle supported thereby. The lowermost tray 48 defines the upper limit of a compartment 54 in the depending end of the tackle box for receiving larger articles.

The bottom wall 14 is secured to a circular panel 56 formed of buoyant material for increasing buoyancy of the tackle box if dropped overboard while fishing. A circular cushion or pad 58, preferably formed from buoyant material, is similarly secured to the upper surface of the top wall 12 so that the box may be used as a stool or seat by the fisherman.

A strap-like handle 60 is diametrically secured by its respective ends to the top wall for carrying the tackle box.

A latch member 62, secured respectively to one edge of the door member 24 and side wall 16, maintains the door in closed position when not in use.

Operation

In operation, the latch member 62 is released and the door is manually rotated in a sliding action in the tracks 22 about the axis of the tackle box to the position shown by FIG. 2 to expose the trays supported by the respective partitions. Either one of the trays 36, 46 or 48 may then be manually rotated about its vertical axis or moved outwardly through the door opening to its dotted line position of FIG. 3 and manually rotated about the axis of the respective bolt means for selection of fishing tackle supported by the respective tray.

Obviously the invention is susceptible to changes or alterations without defeating its practicability. Therefore, I do not with to be confined to the preferred embodiment shown in the drawings and described herein.

I claim:

1. A combination seat and tackle box, comprising:
   an upright cylindrical side wall;
   top and bottom end walls secured to the respective ends of said side wall,
   said side wall having an access opening between its ends extending circumferentially through substantially 180°;
   circumferential track means including an annular flange secured to each said top and bottom end walls and spaced outwardly of the outer surface of the respective end portion of said side wall;
   an arcuate door formed on a radius complemental with the outer surface of said side wall and slidably supported by said track means for opening and closing the access opening;
   a plurality of circular horizontal vertically spaced partitions secured to said side wall,
   said partitions each having a radial slot projecting toward the access opening;
   a like plurality of circular trays coaxially supported by said partitions; and,
   bolt means extending coaxially through the respective said tray and partition for horizontal rotative and sliding movement of each tray with respect to its supporting partition.

2. The combination according to claim 1 and further including:
   a panel formed from buoyant material underlying said bottom end wall;
   a seat cushion overlying and secured to said top end wall; and,
   a handle secured to said top end wall.

* * * * *